(12) United States Patent
Gerardiere

(10) Patent No.: US 8,362,920 B2
(45) Date of Patent: Jan. 29, 2013

(54) METHOD AND DEVICE FOR LOCATING EACH OF THE WHEELS OF A PAIR OF TWIN WHEELS MOUNTED ON A VEHICLE

(75) Inventor: Olivier Gerardiere, Tournefeuille (FR)

(73) Assignee: Continental Automotive France, Toulouse (FR)

( * ) Notice: Subject to any disclaimer, the term of this patent is extended or adjusted under 35 U.S.C. 154(b) by 632 days.

(21) Appl. No.: 12/593,139

(22) PCT Filed: Mar. 27, 2008

(86) PCT No.: PCT/EP2008/002398
§ 371 (c)(1),
(2), (4) Date: Sep. 25, 2009

(87) PCT Pub. No.: WO2008/125190
PCT Pub. Date: Oct. 23, 2008

(65) Prior Publication Data
US 2010/0085212 A1    Apr. 8, 2010

(30) Foreign Application Priority Data

Mar. 29, 2007  (FR) ..................... 07 02297

(51) Int. Cl.
G08C 17/00  (2006.01)
G08C 19/12  (2006.01)
(52) U.S. Cl. ............... 340/870.28; 340/870.18; 702/138
(58) Field of Classification Search ............ 340/426.31, 340/426.33, 870.01, 870.28, 870, 18; 702/138
See application file for complete search history.

(56) References Cited

U.S. PATENT DOCUMENTS

| | | | |
|---|---|---|---|
| 8,090,503 B2 * | 1/2012 | Lavoie et al. | 701/42 |
| 2004/0189457 A1 | 9/2004 | Watabe | |
| 2006/0279416 A1 | 12/2006 | Watabe | |
| 2010/0231370 A1 * | 9/2010 | Lefaure | 340/438 |
| 2010/0256946 A1 * | 10/2010 | Carresjo et al. | 702/138 |

FOREIGN PATENT DOCUMENTS

| | | |
|---|---|---|
| DE | 10 2006 026 527 | 12/2006 |
| EP | 1 614 550 | 1/2006 |

OTHER PUBLICATIONS

International Search Report dated Jun. 11, 2008, from corresponding PCT application.

* cited by examiner

*Primary Examiner* — Peguy Jean Pierre
(74) *Attorney, Agent, or Firm* — Young & Thompson

(57) ABSTRACT

A method and device for locating each of the wheels of a pair of twinned wheels mounted on a vehicle. Each twinned wheel is equipped with an electromagnetic receiving antenna, and these two twinned wheels are provided with elements of relative blocking rotation-wise designed to make it possible to obtain an offset by a predetermined angle ($\alpha$), such that ($\alpha$) is different from 0° and 180°, between the receiving antennas with which the two twinned wheels are equipped. The vehicle is equipped with a fixed source of emission of an electromagnetic signal suitable for covering an area passed through by the receiving antennas, and the electromagnetic field received by each of the receiving antennas is measured, so as to deduce, from the analysis of the time offset between the variations of the two measured electromagnetic fields, the location of each of the twinned wheels.

9 Claims, 2 Drawing Sheets

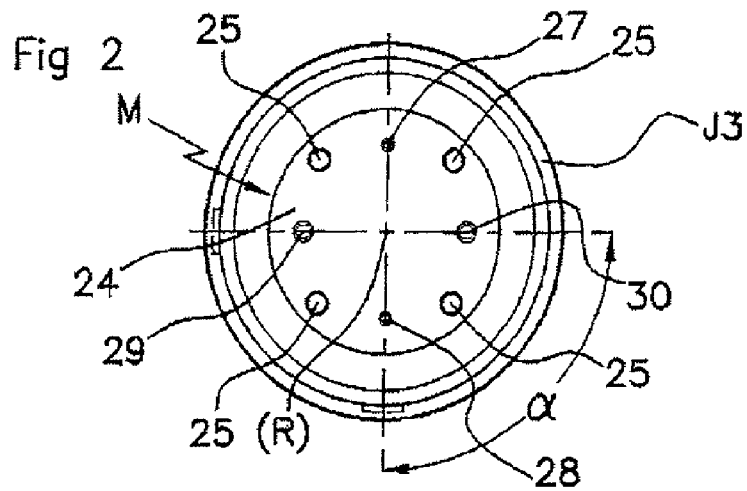
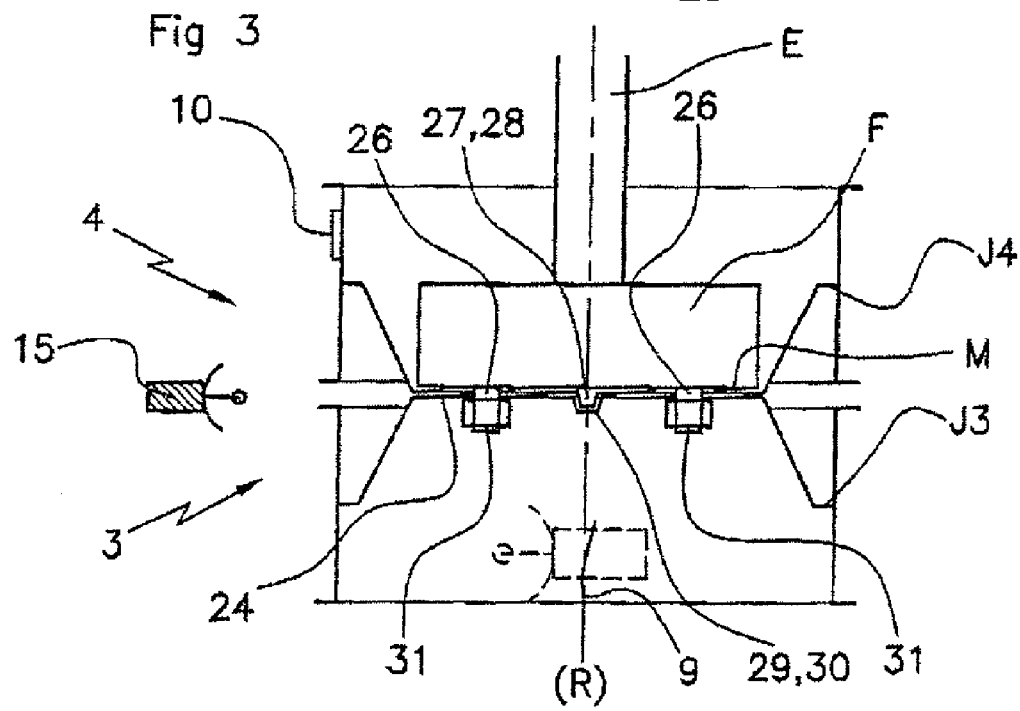
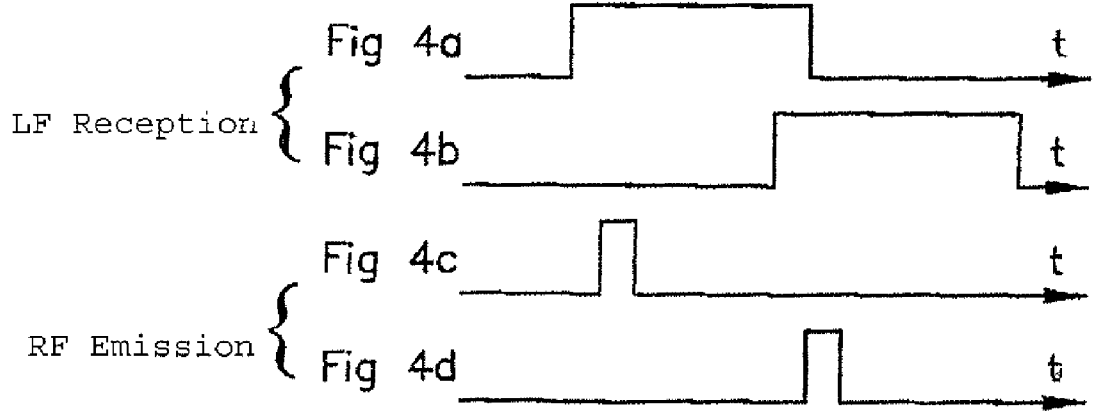

METHOD AND DEVICE FOR LOCATING EACH OF THE WHEELS OF A PAIR OF TWIN WHEELS MOUNTED ON A VEHICLE

FIELD OF THE INVENTION

The invention relates to a method and device for locating each of the wheels of a pair of twinned wheels mounted on one of the ends of a vehicle axle.

BACKGROUND OF THE INVENTION

More and more motor vehicles have, for safety purposes, monitoring systems comprising sensors mounted on each of the wheels of the vehicle, dedicated to measuring parameters, such as pressure or temperature, of the tires with which these wheels are equipped, and intended to inform the driver of any abnormal variation of the measured parameter.

These monitoring systems are conventionally provided, on the one hand, with electronic modules mounted on each of the wheels of the vehicle and incorporating, in addition to the abovementioned sensors, a microprocessor and a radiofrequency emitter, and on the other hand, with a central unit for receiving the signals emitted by the emitters, comprising a computer incorporating a radiofrequency receiver connected to an antenna.

One of the problems that such monitoring systems have to address lies in the requirement to have to associate with each signal received by the receiver of the central unit, an indication concerning the location of the electronic module and therefore of the wheel originating this signal, this requirement remaining throughout the life of the vehicle, that is to say, having to be complied with even after wheel changes or more simply reversals of the positions of these wheels. Currently, one conventional method of locating wheels on a vehicle with two axles and four wheels consists in using three low-frequency antennas each positioned close to one of the wheels of the vehicle, and in performing a locating procedure consisting in successively exciting each of these three antennas by the emission of a low-frequency magnetic field.

According to this procedure, the electronic module mounted on the wheel situated close to the excited antenna controls, in response to and addressed to the central unit, the emission of an identification signal comprising an identification code of said electronic module, such that the successive excitation of the three antennas leads to the location of the three electronic modules mounted on the wheels adjacent to these antennas, and, by deduction, to the location of the fourth electronic module.

The main benefit of such a method lies in the fact that the locating procedure is very fast and leads to almost instantaneous location after the vehicle has been started.

However, this locating method does not make it possible to discriminate the twinned wheels of vehicles equipped with axles with four wheels.

Thus, the document US 2004/0189457 implements a procedure for acquiring wheel identifying codes by placing five receiving antennas close to wheels or twinned wheel trains. However, with such antennas placed in front of a twinned wheel train (and not in front of each of the wheels) it is not possible to physically locate each of the twinned wheels, because each twinned wheel train is received by one and the same receiver which cannot discriminate the position of each of them, even if it does detect two different identifiers. Furthermore, this document requires the use of a plurality of receiving antennas, which is too costly.

Also known from the document DE 10 2006 026 527 is how to automatically acquire the identifiers of each of the wheels with which a truck trailer is equipped. However, in this document, the issue is not to locate each of the wheels, and even less to locate each of the wheels of a twinned wheel train.

Document EP 1 614 550 describes a system automatically locating the wheels of a vehicle (including twinned wheels), but this locating is performed using a separate tool (60) in which the positions of the different wheels and their identifiers are previously stored.

The present invention aims to overcome this drawback and its main objective is to provide a locating method making it possible, for a cost equivalent to the cost of implementing a method of locating wheels on axles with two wheels, to locate each of the wheels of pairs of twinned wheels with which axles with four wheels are equipped.

SUMMARY OF THE INVENTION

To this end, the invention firstly targets a method of locating each of the wheels of a pair of twinned wheels mounted on one of the ends of an axle of a vehicle of rotation axis (R), consisting in:

equipping each twinned wheel with an electromagnetic receiving antenna and means of measuring the electromagnetic field received by said receiving antenna, providing the twinned wheels with means of relative blocking rotation-wise of the two twinned wheels designed so that it is possible to obtain, after said wheels have been mounted on the axle, and in a plane orthogonal to the rotation axis (R), an offset by a predetermined angle ($\alpha$), such that ($\alpha$) is different from 0° and 180°, between the receiving antennas with which said two twinned wheels are equipped, equipping the vehicle with a source of emission of an electromagnetic signal that is fixed relative to the two twinned wheels, said source being arranged and having a power that is suitable for generating an electromagnetic field covering an area that is passed through by the receiving antennas with which each of the twinned wheels is equipped when said wheels rotate, and in measuring the electromagnetic field received by each of the receiving antennas when the emission source is activated, so as to deduce, from the analysis of the time offset between the variations of the two measured electromagnetic fields, the location of each of the twinned wheels.

The principle of the invention has therefore been to offset by a predetermined angle ($\alpha$) the receiving antennas with which two twinned wheels are equipped, so that said antennas arrive in the coverage area of a single emission source with a time offset that is dependent on the value of this angle ($\alpha$).

The electromagnetic field received by each of the receiving antennas undergoes a notable increase when the latter penetrates into the coverage area of the emission source, the principle of the invention thus makes it possible, through a simple analysis of the time offset between the variations of the two measured electromagnetic fields, and by knowing the value of the angle ($\alpha$), to determine the location of each of the two twinned wheels.

Furthermore, this location requires a single emission source at each end of an axle, and an embedded receiving antenna in each twinned wheel, and therefore has a cost price comparable to that of a device for locating wheels on axles with two wheels.

The invention extends to a device for locating each of the wheels of a pair of twinned wheels, comprising:

adapted to equip each twinned wheel, an electromagnetic receiving antenna and means of measuring the electromagnetic field received by said receiving antenna, means of relative blocking rotation-wise of the two twinned wheels, designed to make it possible to obtain, after said wheels have been mounted on the axle, and in a plane orthogonal to their rotation axis (R), an offset by a predetermined angle (α), such that (α) is different from 0° and 180°, between the receiving antennas with which said two twinned wheels are equipped, adapted to be fixedly mounted on the vehicle relative to the two twinned wheels, a source of emission of an electromagnetic signal arranged and having a power suitable for generating an electromagnetic field covering an area passed through by the receiving antennas with which each of the twinned wheels is equipped when said wheels rotate, and means of analyzing the electromagnetic field measured at the terminals of each of the receiving antennas, designed to make it possible to deduce, from the time offset between the variations of the two measured electromagnetic fields, the location of each of the twinned wheels.

According to an advantageous implementation of the invention, the source of emission of the electromagnetic signal and the receiving antennas respectively consist of a sending antenna and of receiving antennas of the low frequency LF antenna type.

Furthermore, the means of relative blocking rotation-wise of the two twinned wheels are designed to define an offset by an angle (α) of between 45° and 90° between the receiving antennas with which said twinned wheels are equipped, this value being in particular adjustable according to the characteristics of the emitting antenna.

As an example of application, the inventive device in particular targets the location of twinned wheels comprising identical rims provided with a hub provided with a planar assembly face adapted to make it possible to mount said twinned wheels in a reversed position in which their planar assembly faces are in contact with one another.

For this application, the means of relative blocking rotation-wise of the two twinned wheels are advantageously of mechanical type and comprise, provided on each planar assembly face of the hub, and at one and the same distance from the rotation axis (R):

at least one boss projecting relative to said assembly face, and for each boss, a void with a shape designed to house said boss, offset by an angle (α) relative to the position of this boss.

Other characteristics, aims and benefits of the invention will become apparent from the following detailed description given with reference to the appended drawings which represent thereof, by way of nonlimiting example, a preferred embodiment.

BRIEF DESCRIPTION OF THE DRAWINGS

FIG. 2 is a front view of a rim for a twinned wheel provided with means of relative blocking translation-wise according to the invention, FIG. 3 is a schematic cross-section, through a vertical plane of symmetry, of one end of an axle equipped with two twinned wheels associated with locating means according to the invention, FIGS. 4a and 4b are two graphs representative of the respective electromagnetic fields measured at the terminals of receiving antennas with which two twinned wheels are equipped, and FIGS. 4c and 4d represent the signals delivered to a central unit mounted on a vehicle, from two electronic modules mounted on two twinned wheels equipped with locating means according to the invention.

DETAILED DESCRIPTION OF THE INVENTION

Figure 1A:
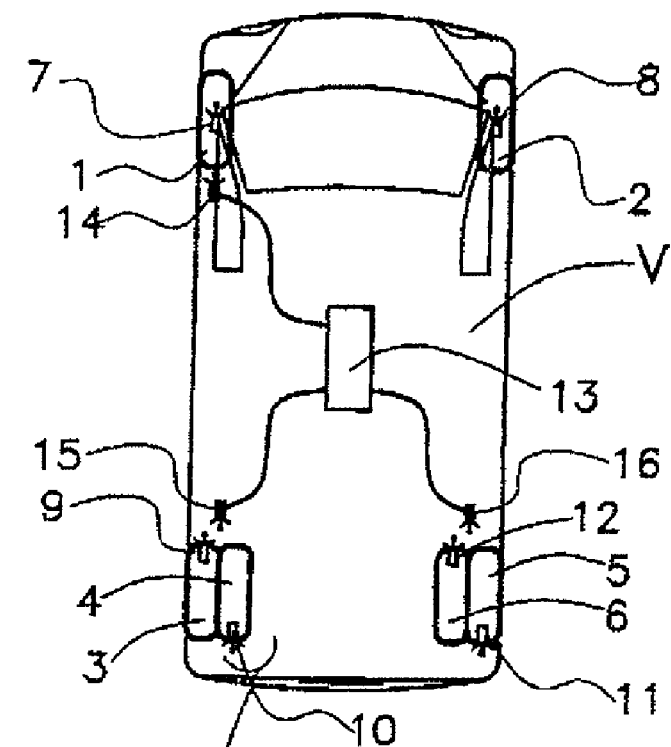
FIG. 1a is a schematic plan view of a vehicle provided with a rear axle with four wheels, equipped with a monitoring system associated with a device according to the invention for locating the wheels mounted on said vehicle.
Figure 1B:
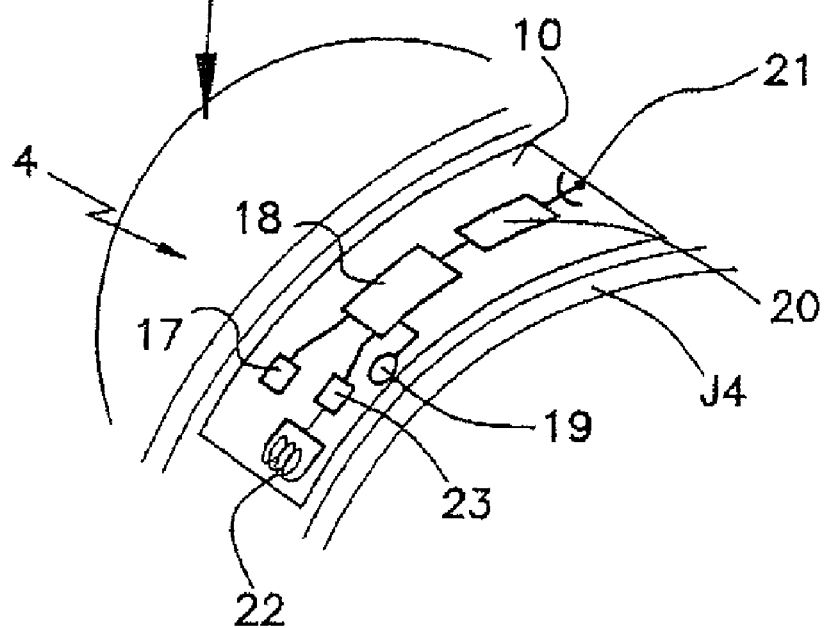
FIG. 1b is a schematic detail view in perspective representing a portion of one of the twinned wheels of this vehicle and the electronic module with which the latter is equipped.

The locating device according to the invention represented by way of example in FIGS. 1a and 1b is intended for locating the position of the wheels of a vehicle V comprising a front axle with two wheels, a left front wheel 1 and a right front wheel 2, and a rear axle with four wheels, two left twinned wheels 3 and 4 and two right twinned wheels 5 and 6.

This locating device is more specifically intended for installation on vehicles V provided with a monitoring system conventionally comprising, firstly, associated with each wheel 1, 2, 3, 4, 5 and 6 respectively, an electronic module 7, 8, 9, 10, 11 and 12, for example attached to the rim, such as J3 and J4, of said wheel, so as to be positioned inside the tire jacket (FIG. 1b).

Each of these electronic modules 7, 8, 9, 10, 11 and 12 incorporates, for example and firstly, sensors such as 17 dedicated to measuring parameters, such as pressure and/or temperature of the tire, connected to a microprocessor-based computation unit 18 electrically powered by means of a button cell battery 19, and linked to an RF emitter 20 connected to a radiofrequency RF antenna 21.

The monitoring system also comprises a centralized computer or central unit 13 located in the vehicle V, comprising a microprocessor and incorporating an RF receiver able to receive the signals emitted by each of the emitters 20 of the electronic modules 7, 8, 9, 10, 11 and 12.

Usually, such a monitoring system, and in particular its central unit 13, are designed to inform the driver of any abnormal variation of the parameters measured by the sensors 17 associated with the wheels 1, 2, 3, 4, 5 and 6.

The locating device specifically comprises three low frequency LF emitting antennas 14, 15 and 16 connected to the central unit 13 and respectively consisting of:

an antenna 14 positioned close to one of the front wheels, in the example, the left front wheel 1, an antenna 15 positioned close to the left pair of twinned wheels 3 and 4, equidistant from said twinned wheels, so as to generate an electromagnetic field covering an area passed through by the electronic modules 9 and 10 with which each of these twinned wheels is equipped when the latter rotate, and an antenna 16 positioned close to the right pair of twinned wheels 5 and 6, equidistant from said twinned wheels, so as to generate an electromagnetic field covering an area passed through by the electronic modules 11 and 12 with which each of these twinned wheels is equipped when the latter rotate.

The locating device also comprises, incorporated in each electronic module with which an emitting antenna 14, 15 and 16 is associated, that is to say, in the example, the electronic modules 7 and 9, 10, 11 and 12, a low-frequency LF receiving antenna 22 linked to the computation unit 18 via means 23 of amplifying and shaping the signal delivered by said receiving antenna, representative of the electromagnetic field received by the latter.

Furthermore (FIG. 3), the locating device also comprises means of relative blocking rotation-wise of the two twinned wheels 3 and 4, 5 and 6 forming each pair of twinned wheels, designed to make it possible to obtain, after said wheels have been mounted on the spindle F of an axle E, and in a plane orthogonal to the rotation axis (R) of said axle, an offset by a predetermined angle α, equal to 90° in the example represented in FIGS. 2 and 3, between the electronic modules and 10, 11 and 12 with which said two twinned wheels are equipped, and therefore between the receiving antennas 22 incorporated in said electronic modules.

According to the example represented in FIGS. 2 and 3, the twinned wheels 3 and 4 and 5 and 6 comprise identical conventional rims, such as J3 and J4, provided with a hub M provided with a planar assembly face 24 pierced with orifices 25 each able to house a stud 26 attached to the spindle F, and adapted to make it possible:

- to mount two twinned wheels 3 and 4, 5 and 6 in a reversed position relative to each other, in which their planar assembly faces 24 are in contact with one another,
- and to block this pair of twinned wheels attached in this way by their assembly faces 24, by means of nuts 31 screwed onto the studs 26. This blocking is performed so that the electronic modules 9 and 10 make a predetermined angle a between them (in the example, this angle is 90°).

In these conditions, the means of relative blocking rotation-wise associated, according to the invention, with the twinned wheels 3 and 4, 5 and 6 are advantageously of mechanical type and comprise, provided on each planar assembly face 24 of the hub M:

- two bosses 27 and 28 projecting relative to the assembly face 24, aligned along one and the same diametral axis, symmetrically either side of the rotation axis (R),
- and two voids 29 and 30 arranged and with a shape adapted so that each can house a boss 27 and 28, said voids being aligned along one and the same diametral axis offset by an angle α=90° relative to the diametral axis of said bosses.

Thanks to these arrangements, and as represented in FIG. 3, mounting two identical rims J3 and J4 on an axle E (that is to say, two rims equipped with an electronic module 9 and 10 fixed in a fixed position on the circumference of each of said rims, such as an electronic module attached to the tire valve), leads to said electronic modules being physically offset by 90°.

The direct consequence of this physical offset is, as represented in FIGS. 4a and 4b, a time offset, dependent on the value of the angle α, between the variations of the electromagnetic fields measured by the receiving antennas 22 incorporated in the two duly offset electronic modules, said variations resulting from the penetration of each of said receiving antennas into the coverage area of the emitting antenna 15 and 16.

According to the invention, the information relating to this time offset is transmitted to the central unit 13 via the emitters 20, by the emission of two pulses, represented in FIGS. 4c and 4d, delivered after the detection of an increase of the electromagnetic fields respectively measured by the two receiving antennas 22.

The transmission of these two pulses is equivalent to providing the central unit 13 with information, representative of the time offset, that is sufficient to make it possible to deduce, from the knowledge of the value of the angle α, the order in which the two twinned wheels 9 and 10 (or 11 and 12) pass in front of the emitting antenna 15 (or 16), and therefore the location of each of said wheels. If the wheels are always mounted in the same way (the first pulse then belongs to the inner wheel and the second pulse belongs to the outer wheel—for example).

According to the invention, the activation of the two antennas 15 and 16 thus makes it possible respectively to locate the twinned wheels 9 and 10 and 11 and 12.

As far as the activation of the antenna 14 is concerned, this makes it possible to conventionally locate the left front wheel 1.

The location of the right front wheel 2 is deduced, finally, from the preceding locations.

Consequently, the activation of n emitting antennas 14, 15 and 16 makes it possible to locate, according to the invention, all the wheels of a vehicle V equipped with an axle with two wheels 1 and 2 and with (n−1) axles with four wheels 9, 10, 11 and 12.

The invention claimed is:

1. A method of locating each of the wheels of a pair of twinned wheels mounted on one end of an axle of a vehicle of rotation axis, said method consisting of:
   - equipping each twinned wheel with an electromagnetic receiving antenna and a microprocessor-based computation unit linked to said receiving antenna for measuring the electromagnetic field received by said receiving antenna;
   - equipping the vehicle with a source of emission of an electromagnetic signal that is fixed relative to the two twinned wheels, said source being arranged and having a power that is suitable for generating the electromagnetic field covering an area that is passed through by the receiving antennas with which each of the twinned wheels is equipped when said wheels rotate;
   - providing relative blocking rotation-wise of the two twinned wheels to allow for angularly offsetting of the receiving antennas with which each of said two twinned wheels are equipped for obtaining, after said wheels have been mounted on the axle, and in a plane orthogonal to the rotation axis, an offset by a predetermined angle, such that the angle is different from 0° and 180°, between the receiving antennas with which each of said two twinned wheels are equipped; and
   - measuring the electromagnetic field received by each of the receiving antennas when the source of emission of the electromagnetic signal is activated, so as to deduce, from analysis of time offset between variations of the two measured electromagnetic fields, the location of each of the twinned wheels.

2. A device for locating each of the wheels of a pair of twinned wheels mounted on one of the ends of an axle of a vehicle of rotation axis, comprising:
   - adapted to equip each twinned wheel, an electromagnetic receiving antenna and means of measuring the electromagnetic field received by said receiving antenna;
   - adapted to be fixedly mounted on the vehicle relative to the two twinned wheels, a source of emission of an electromagnetic signal arranged and having a power suitable for generating an electromagnetic field covering an area passed through by the receiving antennas with which each of the twinned wheels is equipped when said wheels rotate;
   - means of angularly offsetting the receiving antennas with which said two twinned wheels are equipped for obtaining, after said wheels have been mounted on the axle, and in a plane orthogonal to the rotation axis, an offset by a predetermined angle, such that the angle is different from 0° and 180°, between the receiving antennas with which said two twinned wheels are equipped; and means of analyzing the electromagnetic field measured at the terminals of each of the receiving antennas for determining from time offset between variations of the two measured electromagnetic fields, the location of each of the twinned wheels.

3. The locating device as claimed in claim 2, wherein the source of emission of the electromagnetic signal and the receiving antennas respectively consist of a sending antenna and of receiving antennas of the low frequency LF antenna type.

4. The locating device as claimed in claim 3, wherein the means of angularly offsetting the two twinned wheels are designed to define an offset by an angle of between 45° and 90° between the receiving antennas with which said twinned wheels are equipped.

5. The device as claimed in claim 3, wherein, for locating twinned wheels comprising identical rims provided with a hub with a planar assembly face designed to allow said twinned wheels to be mounted in a reversed position in which their planar assembly faces are in contact with one another, the means of angularly offsetting the two twinned wheels comprise, provided on each planar assembly face of the hub, and at one and the same distance from the rotation axis:
  at least one boss projecting relative to said assembly face, and
  for each boss, a void with a shape designed to house said boss, offset by an angle relative to the position of this boss.

6. The locating device as claimed in claim 2, wherein the means of angularly offsetting the two twinned wheels are designed to define an offset by an angle of between 45° and 90° between the receiving antennas with which said twinned wheels are equipped.

7. The device as claimed in claim 6, wherein, for locating twinned wheels comprising identical rims provided with a hub with a planar assembly face designed to allow said twinned wheels to be mounted in a reversed position in which their planar assembly faces are in contact with one another, the means of angularly offsetting the two twinned wheels comprise, provided on each planar assembly face of the hub, and at one and the same distance from the rotation axis:
  at least one boss projecting relative to said assembly face, and
  for each boss, a void with a shape designed to house said boss, offset by an angle relative to the position of this boss.

8. The locating device as claimed in claim 2, wherein, for locating twinned wheels comprising identical rims provided with a hub with a planar assembly face designed to allow said twinned wheels to be mounted in a reversed position in which their planar assembly faces are in contact with one another, the means of angularly offsetting the two twinned wheels comprise, provided on each planar assembly face of the hub, and at one and the same distance from the rotation axis:
  at least one boss projecting relative to said assembly face, and
  for each boss, a void with a shape designed to house said boss, offset by an angle relative to the position of this boss.

9. The device as claimed in claim 2, wherein, for locating twinned wheels, comprising identical rims provided with a hub with a planar assembly face designed to allow said twinned wheels to be mounted in a reversed position in which their planar assembly faces are in contact with one another, the means of angularly offsetting the two twinned wheels comprise, provided on each planar assembly face of the hub, and at one and the same distance from the rotation axis:
  at least one boss projecting relative to said assembly face, and
  for each boss, a void with a shape designed to house said boss, offset by an angle relative to the position of this boss.

* * * * *